(12) United States Patent
Pesavento et al.

(10) Patent No.: US 11,334,924 B2
(45) Date of Patent: May 17, 2022

(54) AUTOMATED IMAGE ADS

(71) Applicant: Yahoo Holdings, Inc., Sunnyvale, CA (US)

(72) Inventors: Gerald Pesavento, San Francisco, CA (US); Sachin Sudhakar Farfade, Santa Clara, CA (US); Venkat Kumar Reddy Barakam, Sunnyvale, CA (US); Ramu Adapala, Karnataka (IN); Sripathi Ramadurai, San Jose, CA (US); Pierre Garrigues, San Francisco, CA (US)

(73) Assignee: Yahoo Ad Tech LLC, Dulles, VA (US)

( * ) Notice: Subject to any disclaimer, the term of this patent is extended or adjusted under 35 U.S.C. 154(b) by 1060 days.

(21) Appl. No.: 15/351,931

(22) Filed: Nov. 15, 2016

(65) Prior Publication Data

US 2018/0137542 A1    May 17, 2018

(51) Int. Cl.
*G06Q 30/02*    (2012.01)
*G06T 11/60*    (2006.01)

(52) U.S. Cl.
CPC .......... *G06Q 30/0276* (2013.01); *G06T 11/60* (2013.01)

(58) Field of Classification Search
CPC ....................................... G06Q 30/0207–0277
USPC ............................................ 705/14.1–14.73
See application file for complete search history.

(56) References Cited

U.S. PATENT DOCUMENTS

| | | | |
|---|---|---|---|
| 2010/0099441 A1* | 4/2010 | Agarwal ................ | G06Q 30/02 455/466 |
| 2013/0218665 A1* | 8/2013 | Abbott ............... | G06Q 30/0244 705/14.43 |
| 2015/0206169 A1* | 7/2015 | Ye ...................... | G06Q 30/0242 705/14.41 |

OTHER PUBLICATIONS

E. Google, "About responsive display ads", retrieved from https://support.google.com/google-ads/answer/6363750?hl=en, published on Jan. 17, 2013 (Year: 2013).*

* cited by examiner

*Primary Examiner* — Sam Refai
(74) *Attorney, Agent, or Firm* — Cooper Legal Group LLC

(57) ABSTRACT

A system for generating an advertisement is provided. The system may receive an advertisement request from a client device and select an advertisement from a database in response to the advertisement request. The system may identify an advertiser web server associated with the advertisement, for example a landing page. The system may retrieve a picture from the advertiser web server and integrate the picture with the advertisement to generate an enhanced advertisement. The system may serve the enhanced advertisement to the client device.

20 Claims, 5 Drawing Sheets

AUTOMATED IMAGE ADS

BACKGROUND

1. Field of the Invention

The present application generally relates to a system for automatically generating an advertisement.

SUMMARY

A system for generating an advertisement is provided. The system may receive an advertisement request from a client device and select an advertisement from a database in response to the advertisement request. The system may identify an advertiser web server associated with the advertisement, for example a landing page. The system may retrieve a picture from the advertiser web server and integrate the picture with the advertisement to generate an enhanced advertisement. The system may serve the enhanced advertisement to the client device.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

Figure 1:
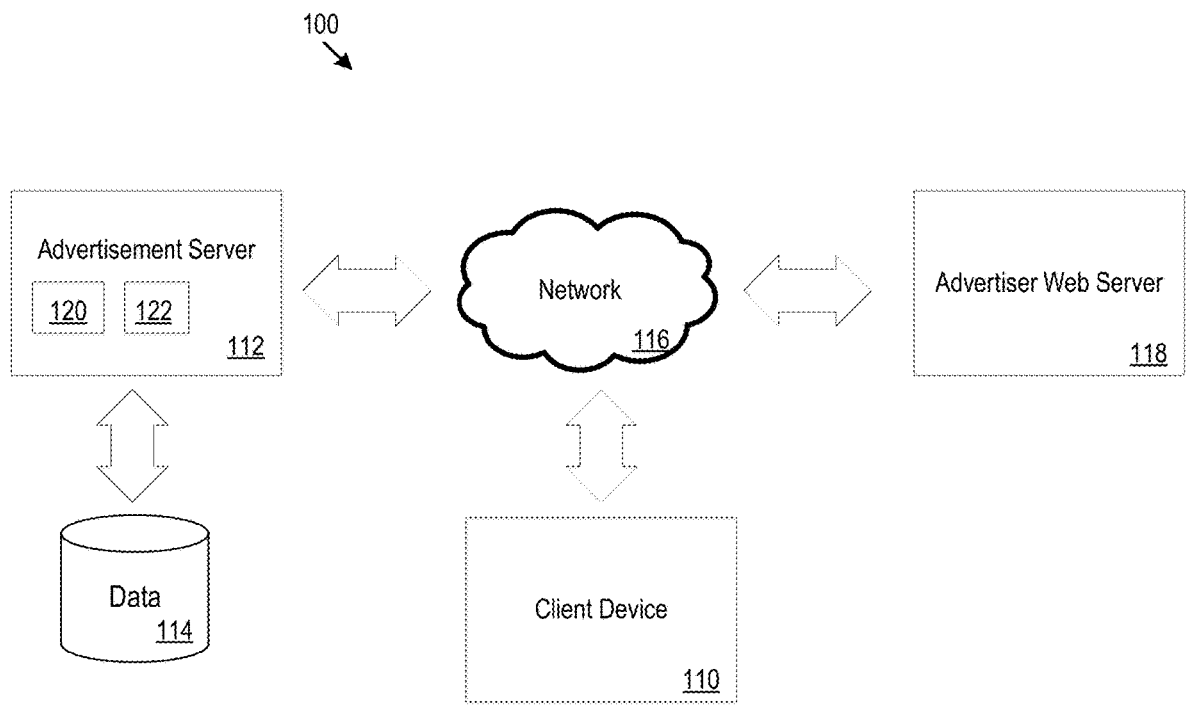
FIG. 1 is a block diagram of a system for automatically generating an advertisement.

FIG. 1 is a block diagram of a system 100 for automatically generating advertisements. The system 100 may include a client device 110, an ad server 112, and an advertiser web page server 118. The client device 110 may be any one of a various number of devices including a computer, lap top, tablet, phone, or other device with web browsing or ad capability. The user may access a web browser on the client device 110. As a page loads onto the web browser or based on a request from a particular app, the client device 110 may request an advertisement from the ad server 112. The client device may be connected to the ad server 112 through a network 116 such as the Internet. Accordingly, the client device 110, the ad server 112, and the advertiser web page server 118 may be located each on different premises. For example, the client device may reside at a client residence, the ad server may reside at a search engine or content provider (e.g. Yahoo! Inc.), the advertiser web page server may be located on the premises of the advertiser or the advertiser's internet service provider (ISP). In some implementations, the client device may be a mobile device an movable within the typical living domain of the user including the user's residence, work, gym, or other frequently visited location. Further, each of the client device 110, the ad server 112, and the advertisement web page server 118 may be configured and controlled by different entities and may be connected to the Internet through different Internet service providers (ISP).

The ad server 112 may receive the advertisement request from the client device 110. The ad server 112 may retrieve an advertisement from a database 114 based on various criteria provided by the client device 110. In one example, the advertisement may be in response to a search query and the advertisement may be provided in response to query terms or user profile information. In other examples, the advertisement may be selected based on content in the web page to be displayed on the client device and/or client profile information. Often times, the advertisements are purely textural advertisements to be displayed on the client device. In other instances, images or video may be stored with the advertisement on the database 114. However, in other instances, the advertisement server 112 may automatically provide an image based on various factors such that the image is not needed to be stored in the database. This may provide more efficient storage and eliminate the need to update the image over time. The ad server 112 may connect with the advertiser web page server 118 through the network 116 to retrieve images (e.g. a picture, photo, and/or video) that is relevant to the advertisement and may be integrated into the advertisement automatically by the ad server 112. The ad server 112 may include an enhancement engine 120 configured to process the images and extract information from the images as described elsewhere in the application. In addition, the ad server 112 may include a ranking engine 122 to rank and/or classify the images thereby selecting an image for inclusion into the advertisement. The ad server 112 may integrate the image into the advertisement and serve the advertisement to the client device 110 through the network 116.

Figure 2:
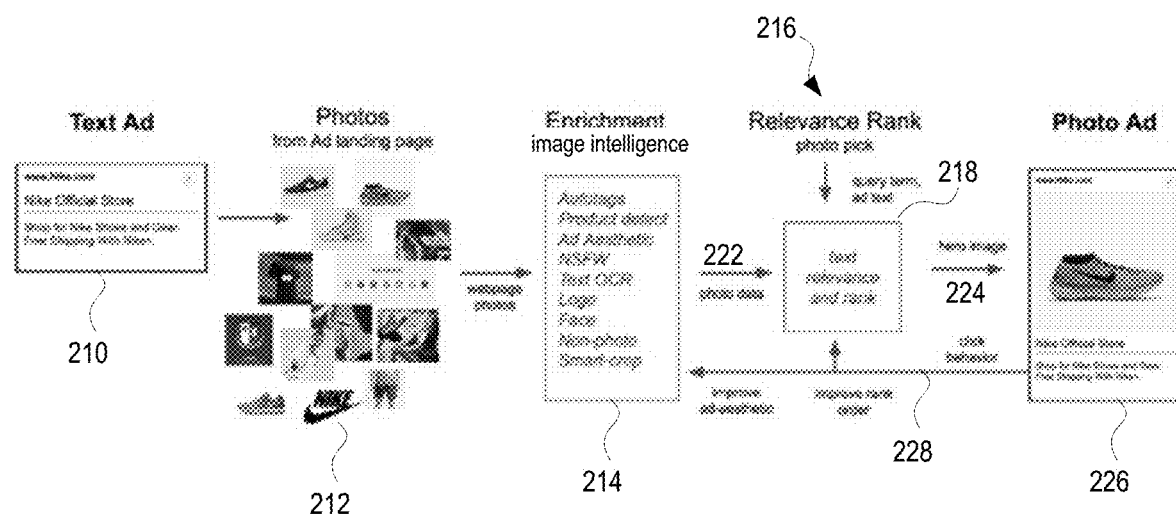
FIG. 2 is a block diagram of a method for automatically creating an advertisement.

FIG. 2 is a block diagram of a figure illustrating a method for automatically generating an advertisement. The method begins in step 210 where a text advertisement is selected to be served. When an advertiser uploads the text advertisement, the advertisement may include a title, description and landing page URL, along with the search queries in which to display the advertisement. The advertisement may be associated with an advertiser web site for example, clicking the advertisement may direct the user to an ad landing page. In step 212, images from the advertiser web site, for example the ad landing page, may be extracted and considered for inclusion into the advertisement. In one example, the system then scrapes photos from the landing page URL. The web page images may be provided to an enrichment engine 214 where information may be extracted from the images to be considered when determining which image can be integrated into the advertisement.

In step 216, a relevance ranking 218 may be determined for the images that were extracted from the advertiser web site. Query terms, advertisement title, advertisement description, categories the advertiser has chosen, the landing page text, the photo metadata, ad text, and web page content may be used as an input to the text relevance ranking step to determine which images may be ranked in what order. In addition, image data 222 from the enrichment step 214, may also be used to determine the image rankings 218. The relevance ranking may select a hero image 224, for example the best ranked image, for inclusion into the advertisement. The hero image may be integrated with the text of the advertisement as indicated by step 226.

Given the advertisement title, advertisement description, categories the advertiser has chosen, the landing page text, and the photo metadata from the previous step, the relevance ranking step may choose the best photo.

An advertisement server may record user reaction to the image advertisement. The user reaction may include clicking, mouse over time, or conversion information, (e.g., purchases, signups, or form submissions) related to the automatically generated advertisement. The user information 228 may be provided to the enrichment step 214 to improve the advertisement aesthetics and click likelihood, and/or to the relevance ranking step 216 to improve the rank order or scoring of each image for use with the advertisement. For example, the image may be used for training neural networks with a positive or negative bias. The relevance ranking may find the most suitable image for the advertisement, and can be tuned to optimize a combination of ad clicks, monetization, text relevance and advertisement relevance.

Figure 3:
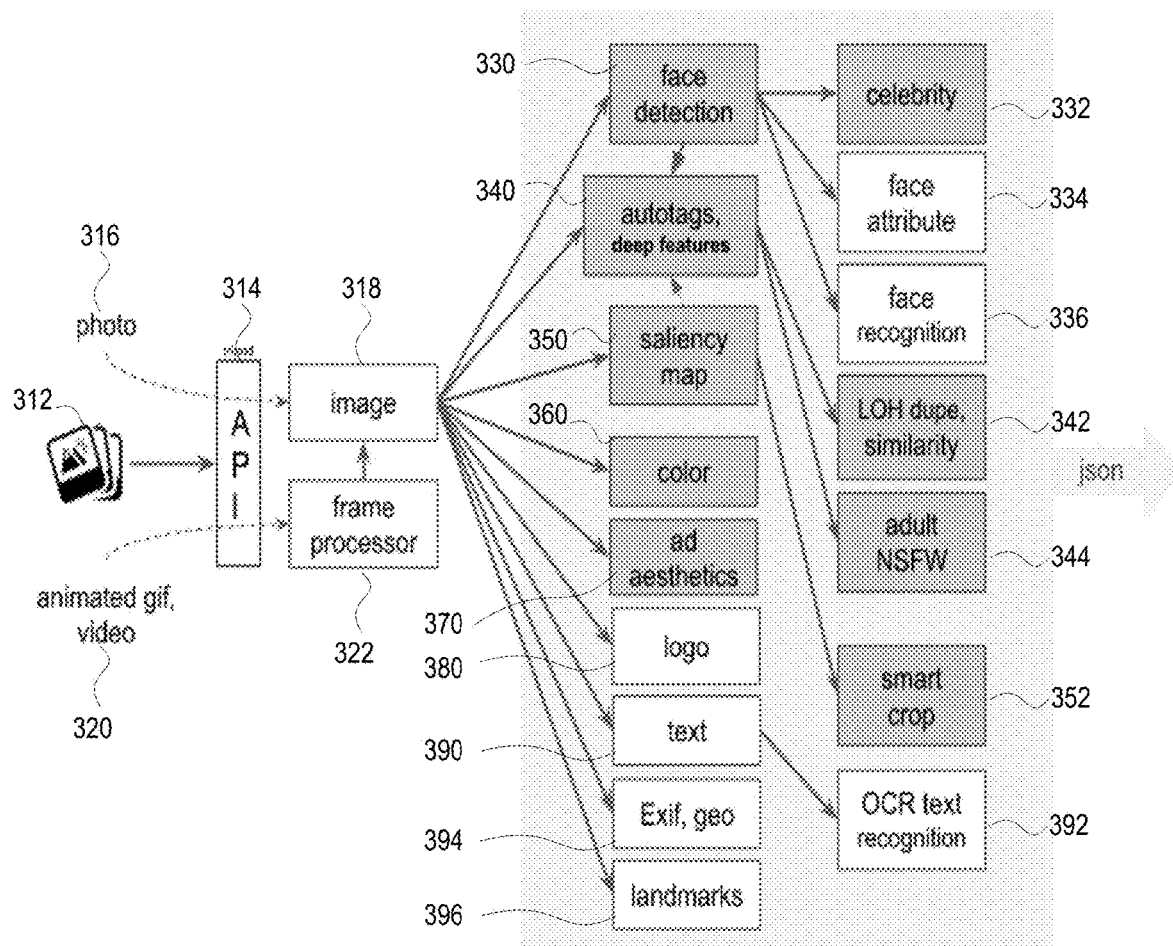
FIG. 3 is a block diagram of a process for photo enrichment.

FIG. 3 is a block diagram of a method for enhancing images. Images 312 may be provided to an image processing engine 310. The images 310 may be provided through an API 314 to a processor. In some examples, a single image 316 may be provided through the API 314 to an image processor 318. In some implementations, a video 320 may be provided through the API 314 to a frame processor 322. The frame processor 322 may filter the frames of the video or GIF 320 and provide one or more frames to the image processor 318 for further processing.

The image processor 318 may perform face detection 330. The face detection may detect a presence and/or location of the face in the image. The face detection may be robust to rotation and occlusion. The face detection may determine if the face is a celebrity face through a celebrity face match algorithm 332. The face detection 330 may also determine face attributes through a face attribute algorithm 334. Face attributes may include eye color, nose type, lip shape, skin tone, and facial geometry. The face attributes may identify a person's age, gender, ethnicity, emotion, or even the location of the face. The face detection 330 may also perform face recognition 336 which may be used to detect non-celebrities, for example faces related to the product, content of the web page, or user profile information. The face detection 330 may feed image information to autotags 340 within the image. In some implementations, the processor may rank images having a face as the main feature lower than images where a face is not the main feature.

Autotags may identify attributes of the image including an object or scene within the image through object or scene recognition to determine the inclusion of items such as cars, bicycles, beach, a sunset, a watch, a dog, etc. Thousands of visual classifiers may be matched to the object through detection and recognition algorithms. For example, a product detection algorithm may identify photos with products featured in them. The processor may also perform a non-photo detection algorithm that determines which images are not natural photos such as drawings, sketches, text, logos, maps and illustrations. The processor may rank non-photos lower than images determined as photos. The processor may also determine the location of various objects in the image and perform smart cropping of the image for automatically cropping and sizing the image within the advertisement. The autotags 340 may also be used in a duplication or similarity detection algorithm 342 to remove duplicate or similar images from being considered. In addition, the autotags 340 may utilize in adult or not suitable for work (NSFW) algorithm 344 to determine certain images that should be filtered based on adult or potentially objectionable content. The algorithm may exclude such photos or rank them much lower.

The processor may check for copyright of material. The copyright may be checked by looking at metadata of the image. Alternatively, data of image may be compared to a database using the filename, file size, metadata, or even partial patterns of the image. In some implementations, more sophisticated pattern matching algorithms may be used to compare the image to other know copyrighted images.

The processor may also create a saliency map 350 to determine where the salient or denser information is in the image. The saliency map may be used to identify and categorize the most important objects within the scene. Saliency information can also be used for finding bare spots in photos that might be most suitable for text overlay. This information may be provided back in the autotags feature 340 of the image processor 318. The saliency map may also perform a smart crop algorithm 352 to remove extraneous space in the image. The image processor may perform color processing 360. The color processing may perform a colored analysis of the image which may be used to filter colors or color schemes that may not be pleasing to the user or may provide difficulty for certain types of displays. The image processor may rank images lower or higher based on the color information, for example if it provides difficulty for a display. The image processor may also analyze aesthetics 370. The aesthetic analysis determines the probability of a image being clicked. The aesthetics may be trained from positive examples that have worked in the past in advertisement, for example using a neural network analysis. This classifier may be trained off the feedback loop on photos that are successful in increasing click rates.

The image processor may also perform logo analysis 380. The logo analysis 380 may determine if a logo is present within the image. In addition, the logo analysis 380 may determine which logo is present through various search and/or matching techniques including for example object correlation. The processor may rank images which contain logos lower than images that do not contain logos. The image processor 318 may also do text analysis 390. The text analysis 390 may find text within the image and may determine founding boxes and locations of words within the image. The processor may rank the image lower if the image contains mostly text or at least more than a threshold amount of text. The text analysis 390 may also utilize an optical character recognition algorithm 392 to determine the text within the image and use the text to filter or rank the image.

The image processor 318 may also perform an exif or geoanalysis 394. The geoanalysis may analyze the coordinates (location) where the image was taken. Further, the exif may analyze additional metadata that accompanies the image for example camera type, focal length, exposure, or other information related to the device and/or camera configuration. The processor 318 may also perform landmark analysis 396. The landmark analysis may identify key landmarks within the image for example the Golden Gate Bridge, the Eifel Tower, or other well-known landmarks according to a database and available images of such landmarks.

Figure 4:
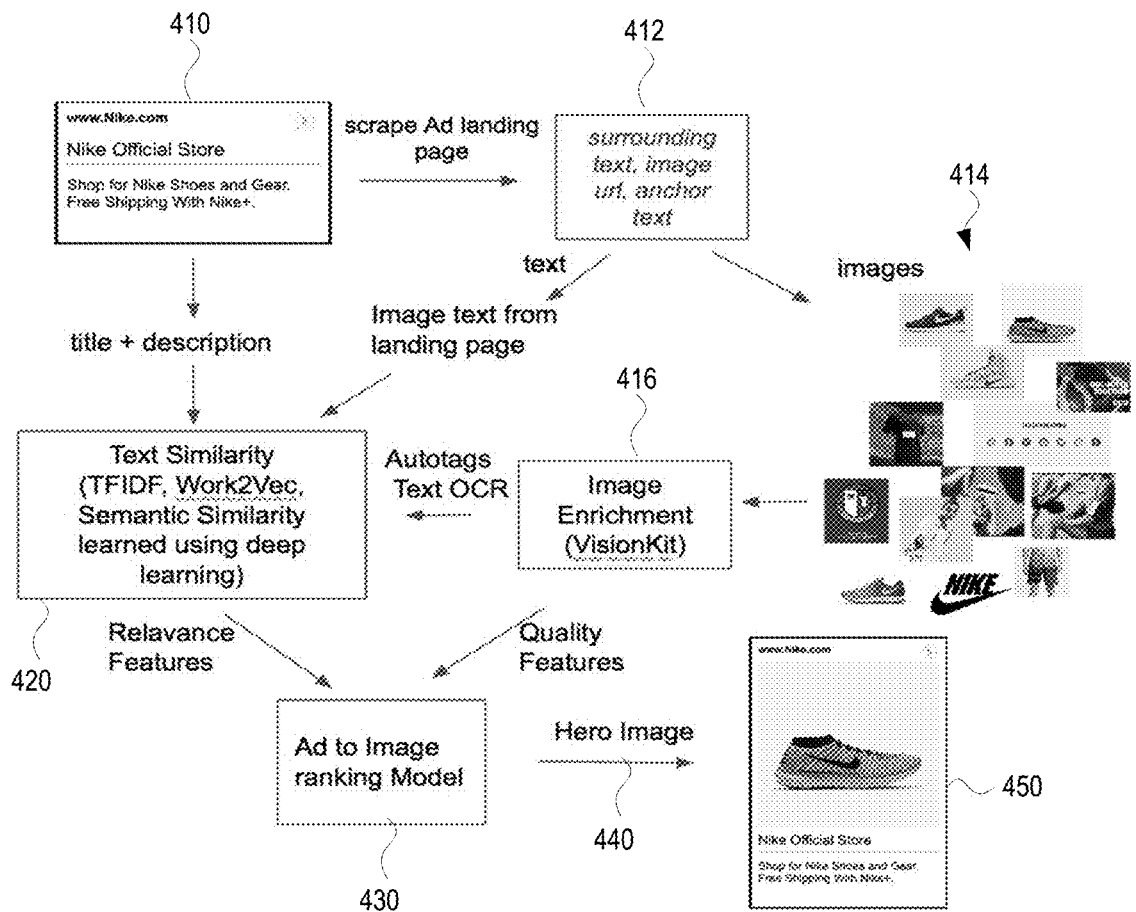
FIG. 4 is a block diagram of a system for automatically generating advertisements illustrating an image shrinking model.

FIG. 4 is a block diagram of a method for automatically generating advertisements including an image ranking. The advertisement 410 may be retrieved from a database based on an advertisement request to an ad server. The ad server may provide the title and description of the advertisement to a deep learning engine 420. The advertisement server may scrape the web site of the advertiser for example, the ad landing page to identify features 412, such as surrounding text images, URLs, and anchor text. Input from the text regarding the landing page and/or web site for example the surrounding text, URLs, the anchor text, and/or other metadata that may be provided to the deep learning engine 420. Further, the images 414 may be provided to an image enrichment engine 416. The autotags and text of the OCR of the image may be provided from the image enrichment engine 416 to the deep learning engine 420. The deep learning engine 420 may perform text similarity and semantics similarity to develop relevance features that have been provided to the image ranking model 430. The image ranking model 430 may also receive quality features for the image enrichment 416. The image ranking model 430 may rank the images that are retrieved from the advertiser web site, for example the ad landing page based on the relevant features and the quality features to determine a hero image 440 that may be integrated into the advertisement 410 to generate an automatically generated image advertisement 450.

The disclosed system may be automated and may require no effort from the advertiser or search property to generate the advertisement. Images integrated into the advertisements may be photos from the ad landing page so that the images are from the start relevant and avoid copyright issues. Machine learning vision steps may be implemented to optimize the image selection, so the best image is chosen. Advertisers may benefit from an increase in click rate. Viewers benefit from a more natural and native web page. Search property may benefit from an increase in click rate and more attractive web pages. The feedback loop may be incorporated for reinforcement learning that improves both ad ranking and photo aesthetics classification.

Figure 5:
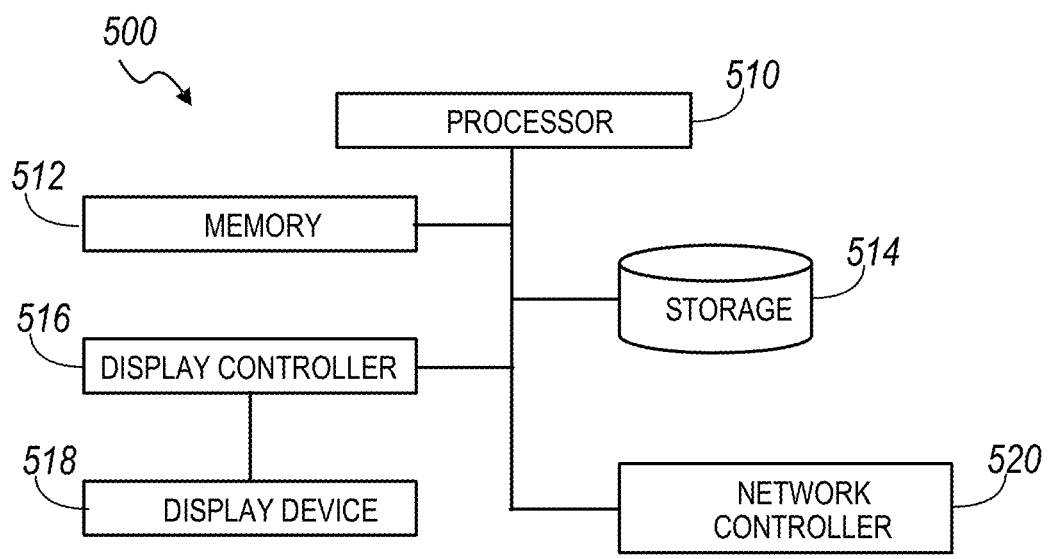
FIG. 5 is a block diagram of a computer system that may be used for automatically generating an advertisement.

Any of the modules, servers, or engines described may be implemented in one or more computer systems. One exemplary system is provided in FIG. 5. The computer system 500 includes a processor 510 for executing instructions such as those described in the methods discussed above. The instructions may be stored in a computer readable medium such as memory 512 or storage devices 514, for example a disk drive, CD, or DVD. The computer may include a display controller 516 responsive to instructions to generate a textual or graphical display on a display device 518, for example a computer monitor. In addition, the processor 510 may communicate with a network controller 520 to communicate data or instructions to other systems, for example other general computer systems. The network controller 520 may communicate over Ethernet or other known protocols to distribute processing or provide remote access to information over a variety of network topologies, including local area networks, wide area networks, the Internet, or other commonly used network topologies.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of this system in that the system is susceptible to modification, variation and change, without departing from spirit of this application, as defined in the following claims.

We claim:

1. A system, comprising:
a database storing a plurality of text advertisements comprising a text advertisement; and
an advertisement server configured to:
access the plurality of text advertisements;
receive, via a first network communication, an advertisement request from a client device;
select the text advertisement, from the database storing the plurality of text advertisements, based on the advertisement request;
responsive to selecting the text advertisement, determine an advertiser web site associated with serving content related to the text advertisement selected from the database based on the advertisement request;
retrieve, via a second network communication, a plurality of images from the advertiser web site associated with serving content related to the text advertisement;
provide at least one of a title or description of the text advertisement to a deep learning engine;
provide autotags of one or more images of the plurality of images to the deep learning engine;
perform, via the deep learning engine, at least one of text similarity or semantics similarity to determine relevance features;
rank the plurality of images based upon features, comprising the relevance features, determined using text of the text advertisement;
select an image, from the plurality of images retrieved from the advertiser web site, based on the ranking;
responsive to selecting the image from the plurality of images retrieved from the advertiser web site:
generate an enhanced advertisement, in response to the advertisement request from the client device, by integrating:
(i) the image selected from the plurality of images retrieved from the advertiser web site; with
(ii) the text advertisement selected from the database based on the advertisement request received from the client device; and
transmit, via a third network communication, the enhanced advertisement generated in response to the advertisement request to the client device.

2. The system of claim 1, wherein the ranking is based upon feedback of user behavior associated with one or more advertisement placements that included the image.

3. The system of claim 1, wherein the ranking is based upon a product detection algorithm which identifies a product in the one or more images.

4. The system of claim 1, wherein the ranking is based upon a non-photo detection algorithm which determines if the image is a drawing, a sketch, text, a logo, a map or an illustration.

5. The system of claim 1, wherein the ranking is based upon an adult content detection algorithm.

6. The system of claim 1, wherein the ranking comprises ranking at least one image lower in response to a text recognition algorithm determining the image includes more than a threshold amount of text.

7. The system of claim 1, wherein the ranking comprises ranking at least one image lower in response to a logo detection algorithm determining that the image is a logo.

8. The system of claim 1, wherein the ranking comprises ranking at least one image lower in response to a face detection algorithm that determines when a face is a main feature in the image.

9. The system of claim 1, wherein the ranking comprises ranking at least one image lower in response to an ad aesthetic algorithm that identifies a most aesthetically pleasing image based on feedback loop training on images that have been successful in increasing click rates.

10. The system of claim 1, wherein the ranking comprises ranking at least one image lower in response to a smart cropping algorithm that sizes the image.

11. The system of claim 1, wherein the ranking is based upon feedback of user behavior associated with the image.

12. The system of claim 11, wherein the ranking is based upon feedback of clicks associated with the image.

13. The system of claim 11, wherein the ranking is based upon feedback of conversions associated with the image.

14. The system of claim 1, wherein the ranking is based upon device configuration information associated with image.

15. The system of claim 1, wherein the ranking is based upon geo-location information associated with the image.

16. A method, comprising:
storing a plurality of text advertisements, comprising a text advertisement, in a database;
receiving, via a first network communication, an advertisement request from a client device;
selecting the text advertisement, from the database storing the plurality of text advertisements, based on the advertisement request;
responsive to selecting the text advertisement, determining an advertiser web site associated with serving content related to the text advertisement selected from the database based on the advertisement request;
retrieving, via a second network communication, a plurality of images from the advertiser web site associated with serving content related to the text advertisement;
providing text of the text advertisement to a deep learning engine;
providing autotags of one or more images of the plurality of images to the deep learning engine;
performing, via the deep learning engine, at least one of text similarity or semantics similarity to determine relevance features;
ranking the plurality of images based upon features, comprising the relevance features, determined using the text of the text advertisement;
selecting an image, from the plurality of images retrieved from the advertiser web site, based on the ranking; and
responsive to selecting the image from the plurality of images retrieved from the advertiser web site:
generate an enhanced advertisement, in response to the advertisement request from the client device, by integrating:
(i) the image selected from the plurality of images retrieved from the advertiser web site; with
(ii) the text advertisement selected from the database based on the advertisement request received from the client device.

17. The method of claim 16, wherein the ranking is based upon a non-photo detection algorithm which determines if the image is a drawing, a sketch, text, a logo, a map or an illustration.

18. The method of claim 16, wherein the ranking is based upon feedback of user behavior associated with one or more advertisement placements that included the image.

19. A system, comprising:
a processor configured to:
receive an advertisement request from a client device;
select a text advertisement from a database based on the advertisement request;
responsive to selecting the text advertisement, determine an advertiser web site associated with serving content related to the text advertisement selected from the database based on the advertisement request;
retrieve a plurality of images from the advertiser web site associated with serving content related to the text advertisement;
provide at least one of a title or description of the text advertisement to a deep learning engine;
provide autotags of one or more images of the plurality of images to the deep learning engine;
perform, via the deep learning engine, at least one of text similarity or semantics similarity to determine relevance features;
rank the plurality of images based upon features, comprising the relevance features, determined using text of the text advertisement;
select an image, from the plurality of images retrieved from the advertiser web site, based on the ranking;
responsive to selecting the image from the plurality of images retrieved from the advertiser web site:
generate an enhanced advertisement, in response to the advertisement request from the client device, by integrating:
(i) the image selected from the plurality of images retrieved from the advertiser web site; with
(ii) the text advertisement selected from the database based on the advertisement request received from the client device; and
transmit the enhanced advertisement generated in response to the advertisement request to the client device.

20. The system according to claim 19, wherein the ranking is based upon a product detection algorithm which identifies a product in the one or more images.

* * * * *